Nov. 27, 1945.  O. C. ECKEL  2,389,965
CLIP
Filed Feb. 15, 1943
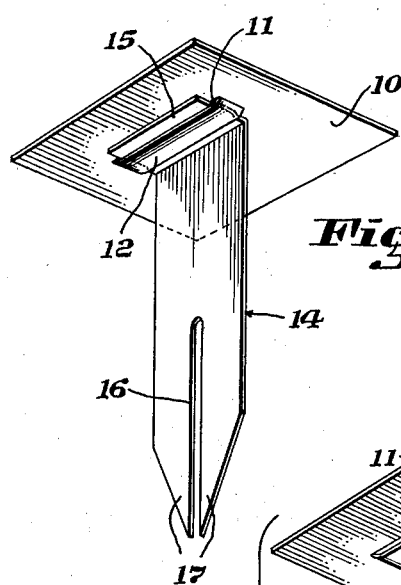
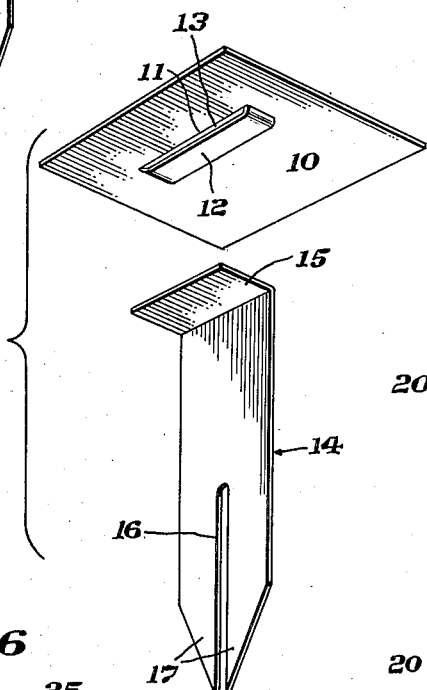
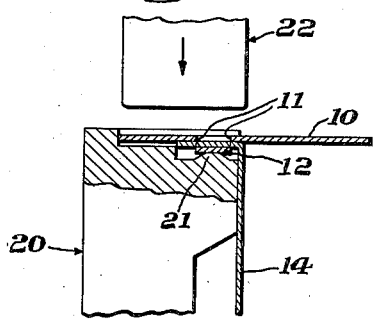
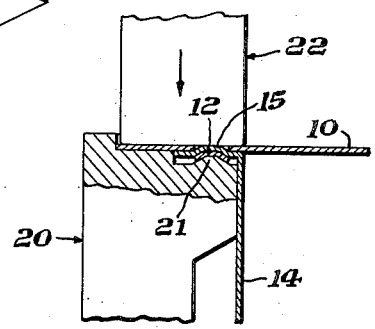
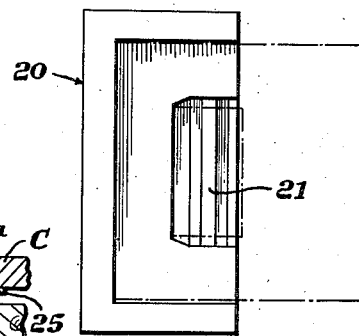
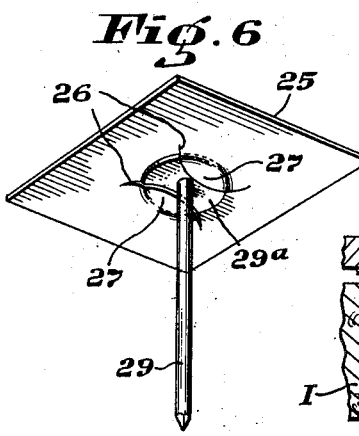
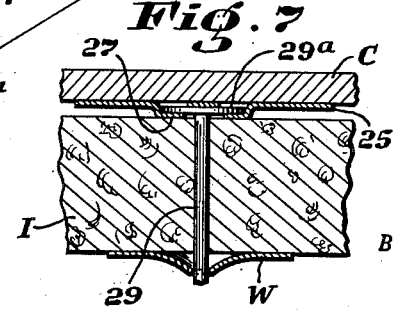
INVENTOR.
Oliver C. Eckel
BY Harold E. Cole
ATTORNEY Patented Nov. 27, 1945

2,389,965

UNITED STATES PATENT OFFICE 2,389,965

CLIP

Oliver C. Eckel, Cambridge, Mass.

Application February 15, 1943, Serial No. 475,929

2 Claims. (Cl. 85—11)

This invention relates to clips, particularly clips suitable to hold a suspended article in position.

Reference is made to my pending patent application Serial No. 464,565, filing date November 5, 1942, for a clip used for similar purposes.

The principal object of my invention is to provide a clip which can be attached to and suspended from a ceiling or wall and which has flexible fingers that can readily be bent to a desired holding position to hold insulation material in place.

Another object is to provide a construction that makes the assembly together of the base and shank so simple that a riveting or a welding or brazing operation is eliminated, and yet said shank is held to said base firmly and permanently.

A further object is to provide an improved method of assembling and fastening said base and shank together that is simple, economical to accomplish and most durable.

The foregoing and other objects which will appear as the nature of the invention is better understood, may be accomplished by a construction, combination and arrangement of parts and method of manufacture such as is disclosed by the drawing and specification. The nature of the invention is such as to render it susceptible to various changes and modifications, and, therefore, I am not to be limited to said disclosures; but am entitled to all such changes therefrom as fall within the scope of my claims.

In the drawing:

Figure 1 is a perspective view of my completed clip in position of use.

Figure 2 is a perspective view of the base and shank of my clip before they are assembled and interlocked.

Figure 3 is a front elevational view, partly in section, showing the shank tongue in position ready to be forced into locking engagement with the base of my clip by two dies.

Figure 4 is a front elevational view, partly in section, showing the shank tongue interlocked with the clip base, upon completion of the final step in my method.

Figure 5 is a plan view of the female die used in the aforesaid method.

Figure 6 is a perspective view of a modified form of my clip having a base and a pin attached thereto.

Figure 7 is a cross-sectional view of a ceiling or wall showing my modified form of clip in its position serving to hold insulation in place.

As illustrated my clip has a flat base 10. Two slits 11 spaced apart are cut therein between which a portion of said base is forced outwardly to provide what I call an offset portion 12. This leaves a space 13 directly opposite said offset which is laterally opposite adjoining portions of said base. When used to hold insulating material in place next to a ceiling or wall said base usually has cement applied to it thus adhesively holding it to said wall or ceiling. The base has relatively large surface area to provide a strong adhesive joint between said base and said ceiling or wall.

Attached to said base 10 is a shank 14 having at one end extremity a tongue portion 15 extending at a right angle. The other end extremity has a slot 16 which extends about half the length of said shank. On each side of said slot 16 fingers 17 are thereby formed. When my clip is in position of use said fingers 17 extend through the insulation and are bent over at a right angle to lie approximately flat against said insulation.

Said locking tongue 15 is inserted into said space 13 opposite said offset portion 12, and extends beyond said space 13 and overlaps a portion of said base 10. To interlock said tongue 15 with said base 10 I provide a female die 20 especially shaped for the purpose, having a bulge 21 narrower than, but which fits against said offset portion 12 for the length thereof. A flat male or hammer die 22 strikes against a portion of said base 10 with such force that the part of said offset portion 12 in contact with said female die bulge 21 is deformed and driven inwardly against said base tongue 15 which deforms and forces part of said tongue to enter said space 13 thereby interlocking said tongue and base. It will be noted in Figure 4 of the drawing that an intermediate portion of said offset portion 12 is sunk inwardly as a result of the force of the hammer like blow to thereby form a longitudinally extending channel therein and this is likewise true of said tongue.

In Figures 6 and 7 of the drawing I have shown a modified form of my invention which is suitable for use where my clip must penetrate hard insulation material in a ceiling, wall or the like. For such materials a more rigid shank and one relatively small in width is desirable. Said clip has a base 25 in which two arcuate slits 26 are cut, the adjoining material being raised or offset slightly to form ridge portions 27. In place of the shank 14 previously described a shank pin 29 is provided which has an enlarged head 29a. Said head 29a is forced into engagement with said ridges 27 by sliding said head sideways into place, said ridges 27 being spaced far enough at their extremities to permit the entrance of said head 29a. Thereafter said ridges 27 are hammered or otherwise forced against said head to lock said shank pin 29 to said base 25.

In Figure 7 of the drawing I have illustrated the use of my modified clip which is cemented to a ceiling C, said pin 29 extending downwardly through the insulation I. The pointed end portion of said pin is cut away. A special self-locking washer W bears against said pin as shown thus giving it a more finished appearance and serving to hold insulation I in place.

What I claim is:

1. A construction clip comprising a flat base member and a shank member having a flat tongue portion of less face area than that of said base and said portion having longitudinally extending side edges spaced in a direction laterally thereof from two opposite side edges of said base, said base having an offset located at an intermediate portion of the face area of said base, there being a space opposite the offset portion within the portions of said base adjoining said offset portion, said tongue portion extending into said space and contacting said offset and said base, said shank member having another portion extending from said tongue portion at an angle thereto, the line of juncture of said two shank member portions being located directly opposite an intermediate face portion of said base and said line of juncture having a longitudinal extent and being spaced in a direction laterally thereof from said two opposite edges, a portion of said shank member other portion being divided and thereby providing a plurality of fingers.

2. A construction clip comprising a flat base member and a shank member having a flat tongue portion of less face area than that of said base and said portion having longitudinally extending side edges spaced in a direction laterally thereof from two opposite side edges of said base, said base having an offset located at an intermediate, off-center portion of the face area of said base, there being a space opposite the offset portion within the portions of said base adjoining said offset portion, said tongue portion extending into said space and contacting said offset, said shank member having another portion extending from said tongue portion at an angle thereto, the line of juncture of said two shank member portions being located directly opposite an intermediate face portion and substantially opposite a center axial line of said base and said line of juncture having a longitudinal extent and being spaced in a direction laterally thereof from said two opposite edges, a portion of said shank member other portion being divided and thereby providing a plurality of fingers.

OLIVER C. ECKEL.